March 23, 1948.　　　C. E. TACK　　　2,438,482

RAILWAY DISC BRAKE ARRANGEMENT

Filed June 8, 1942　　　4 Sheets-Sheet 1

FIG.1.

Inventor
Carl E. Tack
By
Attorney

March 23, 1948. C. E. TACK 2,438,482
RAILWAY DISC BRAKE ARRANGEMENT
Filed June 8, 1942 4 Sheets-Sheet 2

Inventor:
Carl E. Tack
By Orin O. B. Garner
Attorney.

Inventor:
Carl E. Tack
By [signature]
Attorney

March 23, 1948.　　　C. E. TACK　　　2,438,482
RAILWAY DISC BRAKE ARRANGEMENT
Filed June 8, 1942　　　4 Sheets-Sheet 4

Inventor
Carl E. Tack
By [signature]
Attorney

Patented Mar. 23, 1948

2,438,482

UNITED STATES PATENT OFFICE 2,438,482

RAILWAY DISC BRAKE ARRANGEMENT

Carl E. Tack, Chicago, Ill., assignor to American Steel Foundries, Chicago, Ill., a corporation of New Jersey Application June 8, 1942, Serial No. 446,183

20 Claims. (Cl. 188—59)

My invention relates to a brake arrangement for a railway car truck and especially to a design commonly called off-wheel wherein brake discs are supported to rotate with the wheel and axle assembly to afford braking surfaces independently of the tread surfaces of the wheel.

The general object of my invention is to devise an off-wheel brake arrangement wherein braking discs are supported to rotate with each wheel and axle assembly and a brake frame is carried by the truck frame and supports levers with brake shoes for frictional engagement with opposite sides of each brake disc.

A different object of my invention is to provide a brake frame such as above described so mounted that the shoes carried thereon will be supported eccentrically or non-concentrically with respect to the wheel and axle assembly on which the associated brake discs are mounted so that a washing action may be afforded said shoes against respective discs, thus preventing the formation of concentric grooves in the brake surfaces of the discs, as more fully described in my co-pending application Serial No. 421,418, Patent Number 2,355,120, August 8, 1944.

My invention comprehends an arrangement in which the brake frame has resilient connections at each support point which will be adapted to relative lateral movement of the wheel and axle assembly on which two of said support points are carried and the truck frame where the other support point has a torque connection, said torque connection comprising an arrangement in which lateral movements of the brake frame are resisted in shear by resilient elements and all other movements of said frame are resisted in compression by said elements.

A specific object of my invention is to design a brake frame such as above described in which cylinder housings are removably supported adjacent opposite ends of said frame, said housings affording a pivotal fulcrum for the associated brake levers, said levers supporting friction means for engagement with opposite sides of the associated brake disc as above described.

My novel brake frame comprehends a structure comprising a torque tube with a cylinder housing pocket adjacent each end thereof and an intermediate offset portion formed and arranged for a torque connection to the truck frame, said structure also comprising a torque arm at each end of the tube extending at right angle therefrom and formed and arranged for connection to support means carried by the associated journal box of the adjacent wheel and axle assembly.

A different object of my invention is an arrangement such as above described in which each cylinder housing is secured within the associated cylinder housing pocket of the brake frame by means of bolt and nut assemblies connecting said housing to the rear wall of said pocket and by means of spaced vertically disposed pins extending through said housing and through the bottom wall of said pocket, said pins also affording pivotal fulcrum means for the associated brake levers, said levers functioning as above described.

In the drawings, Figure 1 is a top plan view of a railway car truck embodying my invention, the left half thereof being partly in section with the section taken approximately in the horizontal planes indicated by the lines 1—1 of Figure 3.

Figure 4 is an end view partly in section, the section being taken in the transverse vertical planes indicated by the line 4—4 of Figure 1; and Figure 5 is another sectional view taken in the longitudinal vertical planes indicated by the line 5—5 of Figure 1.

Figure 6 is a top plan view of one end of one of the brake frames shown in Figures 1 to 3 inclusive.

In each of said figures certain details may be omitted where they are more clearly seen in other views.

Figure 2:
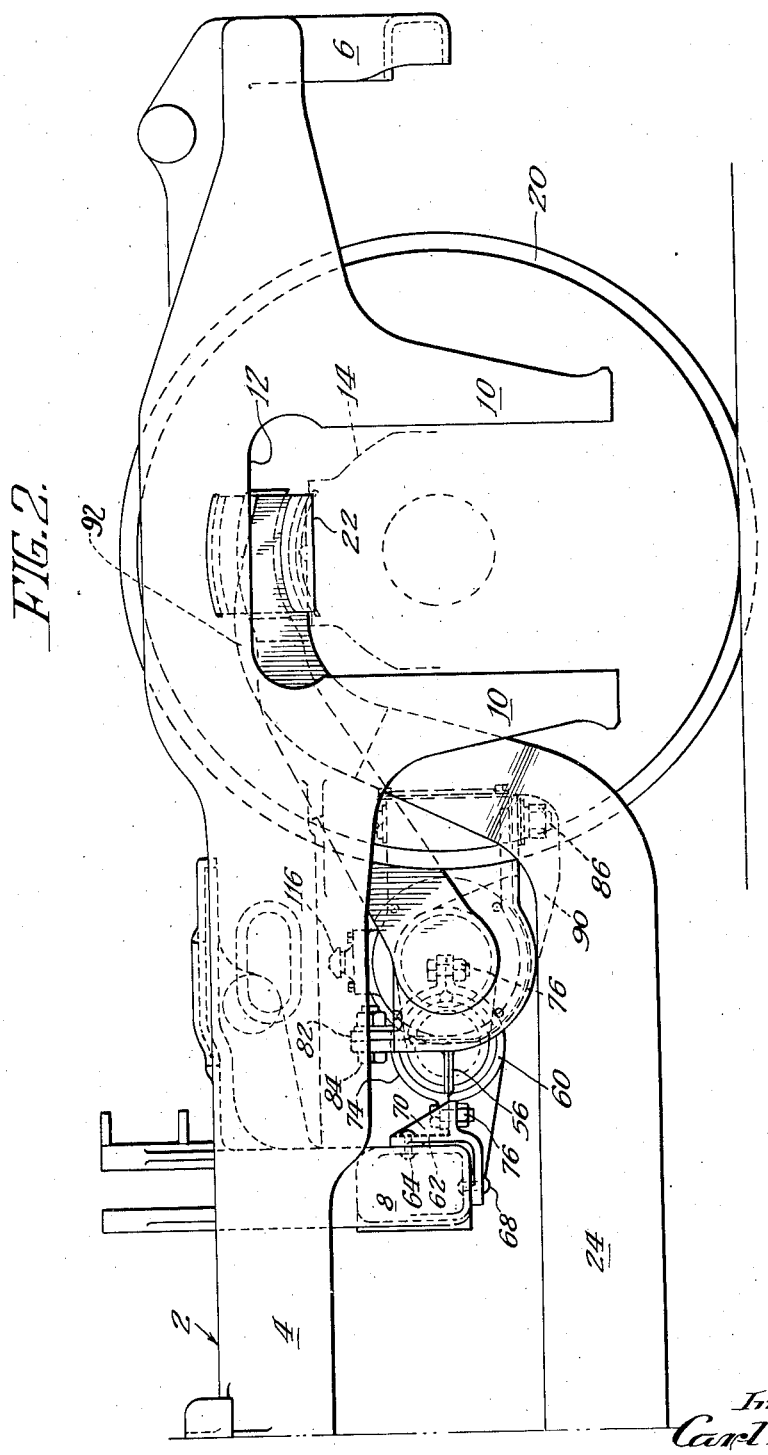
Figure 2 is an enlarged fragmentary side elevation of the truck and brake arrangement shown in Figure 1.

Describing my invention in detail, the truck frame, generally designated 2, comprises the spaced side rails 4, 4, the end rails 6, 6 and the spaced intermediate transoms 8, 8, said transoms affording a means of connection to an associated bolster (not shown), affording support for the car body in the usual manner. At each end of each side rail 4 are the spaced pedestal jaws 10, 10 defining a pedestal opening 12, as best seen at the right in Figure 2, each pedestal opening 12 receiving the associated journal box 14, fragmentarily indicated at the right of Figure 2, said journal box supporting a journal end of the associated wheel and axle assembly, generally designated 16, said assembly comprising the axle 18 and the wheels 20, 20 supported on said axle adjacent opposite ends thereof. On each journal box 14 is positioned an equalizer seat 22, said equalizer seats 22, 22 affording positioning means for the equalizers 24, 24 at opposite sides of the truck, said equalizers affording a resilient support for the frame 2 in the usual manner by means of spaced spring groups (not shown).

Secured to each wheel 20 is a rotor, generally designated 25, said rotor comprising spaced annular friction plates 26, 26 and the intermediate annular support plate 28 as well as the radial blades 30, 30, extending between each friction plate and said support plate as best seen in Figure 4. A disc-like hub member 32 is engaged at 34 with the inner periphery of the support plate 28 and said hub member is secured to the associated wheel 20 by means of the spaced stud bolts 36, 36. The form and arrangement of the rotors 25, 25 may best be understood by a comparison of Figures 1 and 3 from which it will be apparent that each rotor is designed to operate as a double blower during actuation thereof by means of rotation of the associated wheel 20 so that air is drawn between the friction plates 26, 26 from opposite sides of the hub member 32, thus cooling the rotor as will be clearly apparent during and after braking engagement thereof with the associated friction shoes as hereinafter more fully described.

The braking means for each rotor comprises a cylinder housing 38 supported in a manner hereinafter more fully described and receiving the inner ends of the spaced brake levers 40, 40, each of said levers being pivotally connected at 42 to a brake head 44, said brake head carrying a brake shoe 46 formed and arranged for engagement with the adjacent friction plate 26 of the associated rotor 25. Balancing means, generally designated 48 (Figure 3, left), is provided to maintain each brake head 44 in proper position for application to the rotor 25, said balancing means being more fully described in my said co-pending application.

Support for the cylinder housings 38, 38 adjacent opposite ends of each wheel and axle assembly 18 is afforded by means of a brake frame or yoke, generally designated 50, said frame being somewhat C-shaped in plan view, as seen in Figure 1, and comprising the transversely extending torque tube 52, said tube being offset as at 54 intermediate its ends, the offset portion 54 being reinforced at opposite sides thereof by the horizontal webs 56, 56 lying in a plane substantially bisecting the tube 52. The offset portion 54 of the tube 52 is seated on a resilient pad 58, positioned in the substantially cylindrical bracket 60 comprising the vertical web 62 secured at 64, 64 to the adjacent transom 8 and the horizontal web 66 secured at 68 to said transom. The vertical web 62 is reinforced by the spaced vertical webs 70, 70 extending at right angle thereto and defining therewith a pocket 72 (Figures 1 and 3) for the reception of a flange on the semi-cylindrical cover 74 secured at 76, 76 to the bracket 60. A resilient pad 78 (Figure 3, right) is positioned between the cover 74 and the portion 54 of torque tube 52, and it will be understood that when the torque tube is placed in the bracket 60 and the cover 74 is bolted to the bracket at 76, 76, the tube will be compressed between the pads 58 and 78 so that said tube will be resiliently restrained against movement in every direction, the resilient pads 58 and 78 resisting vertical, longitudinal and twisting movements of the tube in compression and transverse movements thereof in shear, as will be clearly understood from a consideration of Figures 1 and 2.

Adjacent each end thereof, the brake frame 50 is provided with a cylinder housing pocket 80 formed and arranged for the reception of the associated cylinder housing 38, said housing comprising a vertical lug 82 bolted at 84, 84 to the rear wall of the pocket 80. The cylinder housing 38 is also secured within said pocket by means of the spaced vertical pins 86, 86, said pins extending through the housing and through openings 88 in the bottom wall 89 of the cylinder housing pocket 80, said pins also affording a pivotal fulcrum for respective of the brake levers 40, 40 received within said housing. The bottom wall 89 of each cylinder housing pocket 80 is reinforced by the spaced vertical webs 90, 90.

Figure 3:
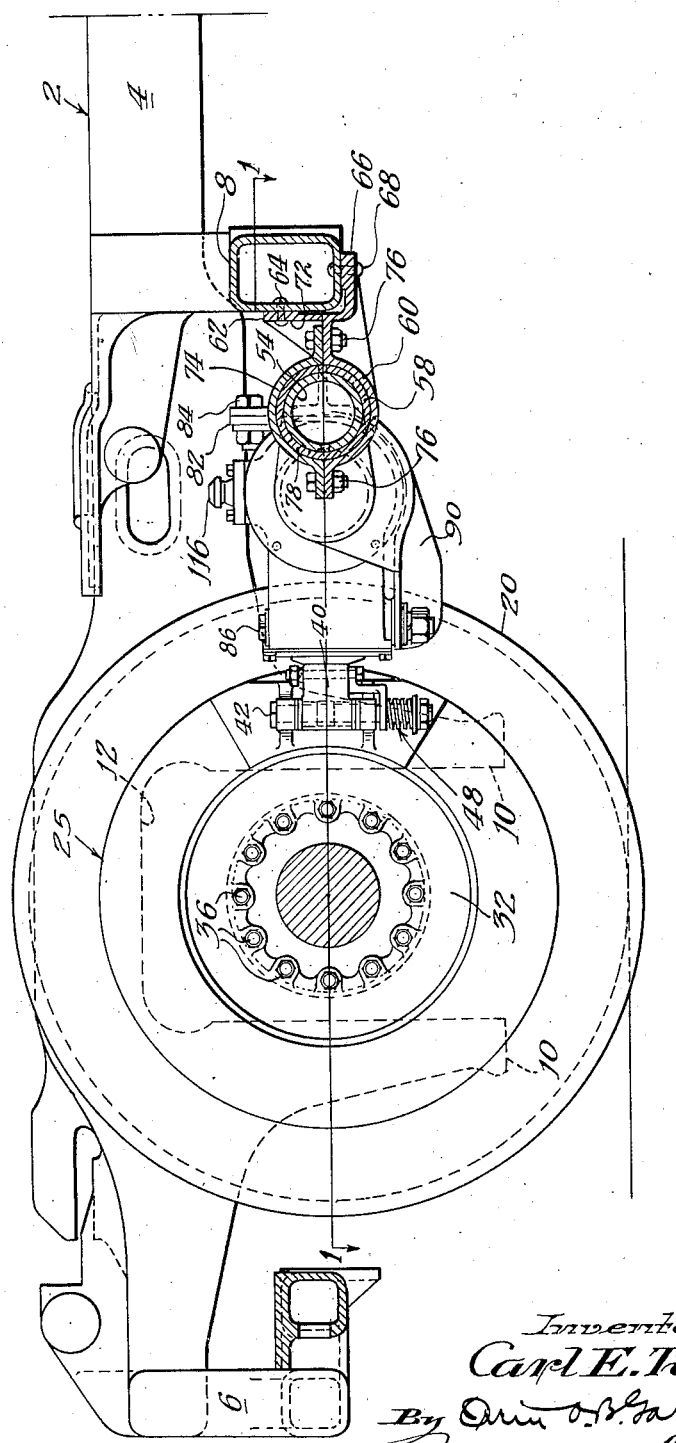
Figure 3 is a fragmentary enlarged side view, partly in section, the section being taken substantially in the vertical longitudinal plane bisecting the truck as indicated by the line 3—3 of Figure 1.

Each end of the torque tube 52 is provided with a torque arm 92 extending at right angle therefrom and received between the vertically spaced resilient means 94, 94 received and retained within the jaw 96 on the adjacent equalizer seat 22 (Figure 3). It will be readily apparent that the brake frame or yoke 50 is nonconcentrically mounted with respect to the adjacent wheel and axle assembly by means of the support from the bracket 60 as well as the support from the equalizer seats 22, 22, said nonconcentric support permitting but resiliently controlling movement of the frame with respect to said assembly. This arrangement will permit the shoes to wash against the respective friction plates 26, 26 of the associated rotor 25, as more fully described in my co-pending application.

It will also be apparent that I have provided a novel arrangement in which each cylinder housing 38 may be readily removed from the brake frame 50 without disturbing the brake frame or cylinder housing supported at the opposite end of said frame, thus facilitating inspection and repair of the brake mechanism associated with each disc, and it will be understood that the arrangement described is of considerable utility in permitting removal of the cylinder housings as well as the brake frame without dismantling the truck, thus affording a convenient method of servicing the brake arrangement disclosed.

Hand brake means is provided for the brake mechanism shown at the right end of the truck, as best seen in Figures 1 and 5, said hand brake means comprising the equalizer bar 98 affording a convenient connection as at 100 intermediate its ends to actuating means (not shown), said equalizer bar being pivotally connected at 102, 102 at opposite ends thereof to respective links 104, 104, each of said links being pivotally connected at 106 to the adjacent hand brake actuating lever 108, said hand brake actuating lever extending into the adjacent cylinder housing 38 for actuation of the associated brake levers 40, 40, as more fully described in my said co-pending application. Support for the hand brake means is provided by means of a pair of bent rods 110, 110, each being welded at 112, 112 (Figure 5) to the torque tube 52, a wear plate 114 being secured in any convenient manner to said rods and affording support for the equalizer bar 98, the links 104, 104 and the adjacent ends of the hand brake actuating levers 108, 108, as will be clearly understood from a consideration of Figure 5 and the right half of Figure 1.

It may be noted that each cylinder housing 38 is provided with a nozzle 116 affording convenient connecting means for an associated fluid supply pipe (not shown) said pipe transmitting fluid to a cylinder (not shown) received within the housing 38 and actuating pistons for operation of the brake levers 40, 40, the cylinder being removable from the housing through an opening closed by a cover plate 118 (Figure 4) secured to the housing by cap screws 120, 120. The power cylinder and its operative engagement with the levers 40, 40 are more fully described in my said co-pending application and form no part of the invention disclosed in this application.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement, a wheel and axle assembly, brake discs thereon, friction means for engagement with said discs, a brake frame supported from the ends of said assembly, means preventing rotation of said brake frame about said assembly, said frame comprising a pocket adjacent each disc, cylinder housings in respective pockets, brake levers fulcrumed therein for connection to said respective friction means, and means securing each housing within the associated pocket, said last mentioned means comprising spaced bolts securing the housing to the rear wall of said pocket, and spaced pins securing the housing to the bottom wall of said pocket, said pins affording fulcrum means for respective of said levers.

2. In a brake arrangement, a wheel and axle assembly, brake discs thereon, friction means for engagement with said discs, a brake frame supported from the ends of said assembly, means preventing rotation of said brake frame about said assembly, said frame comprising a pocket adjacent each disc, cylinder housings in respective pockets, brake levers fulcrumed therein for connection to said respective friction means, and means securing each housing within the associated pocket, said last mentioned means comprising spaced bolts securing the housing to the rear wall of said pocket, and spaced pins securing the housing to the bottom wall of said pocket.

3. In a brake arrangement, a vehicle frame, a supporting wheel and axle assembly, brake discs mounted thereon, brake shoes adapted for engagement with each disc, and support means for said shoes comprising a yoke extending transversely of the frame and supported at its ends from the ends of said assembly outwardly of the wheels, seats on said yoke adjacent opposite ends thereof, cylinder housings positioned thereon, brake levers in each housing engaged with the associated shoes, and means maintaining each housing upon its seat, said last mentioned means comprising pins extending through said housing and said seat and pivotally fulcruming respective of the associated levers.

4. In a brake arrangement, a wheel and axle assembly, brake discs mounted thereon, brake shoes adapted for engagement with each disc, and a support for said shoes comprising a brake frame extending beyond said wheels and supported at the ends thereof from said assembly, means preventing rotation of said brake frame, and removable means on said frame supporting said shoes, said removable means comprising cylinder housings removably secured to said frame, and levers fulcrumed in each housing and operatively engaged with the associated shoes.

5. In a brake arrangement, a wheel and axle assembly, a brake disc mounted thereon, friction means for engagement with opposite sides of said disc, a brake frame supported from the ends of said assembly, a pocket on said frame adjacent said disc, brake lever support means in said pocket, brake levers connected to respective friction means, and means fulcruming said levers from said support means, said fulcruming means also affording securement for said brake lever support means with respect to said brake frame.

6. In a brake arrangement, a wheel and axle assembly, a brake disc supported therefrom, friction means for engagement with said disc, a brake frame extending beyond the wheels and supported from said assembly, means preventing rotation of said frame about said assembly, a pocket on said frame adjacent said disc, brake lever support means removably secured in said pocket, and brake levers fulcrumed from said support means and connected to respective friction means.

7. In a brake arrangement, a wheel and axle assembly, brake discs thereon, friction means for engagement with opposite sides of each disc, a brake frame supported from the ends of said assembly, means preventing rotation of said frame, and removable means on said frame affording support for said friction means, said removable means comprising cylinder housings seated on the frame, brake levers in respective housings and connected to respective friction means, and pivot means for the levers extending through the frame, through respective levers, and through respective housings.

8. In a brake arrangement, a wheel and axle assembly, brake discs thereon, friction means adapted for engagement with said discs, a brake frame supported from the ends of said assembly, said brake frame comprising a pocket adjacent each disc, a cylinder housing in each pocket, brake levers in each housing for connection to respective friction means, and means pivotally fulcruming each lever, said last mentioned means also affording securement for the associated housing with respect to said brake frame.

9. In a brake arrangement, a vehicle frame, a supporting wheel and axle assembly comprising an axle and a member rotatable therewith, a brake frame supported from said vehicle frame and disposed adjacent said member, a cylinder housing removably mounted on said frame, brake levers extending into said housing and carrying friction means for engagement with said member, and means pivotally fulcruming each lever within said housing, said last-mentioned means also affording securement for said housing with respect to said brake frame.

10. In a brake arrangement for a railway car truck comprising a truck frame and a supporting wheel and axle assembly, a rotatable member driven by said assembly, a brake frame supported from said truck adjacent said member, a cylinder housing removably seated on said brake frame, a brake lever extending into said housing and carrying friction means for engagement with said member, and means fulcruming said lever within said housing, said last-mentioned means also affording securement for said housing with respect to said brake frame.

11. In a brake arrangement, a wheel and axle assembly, brake discs thereon, friction means for engagement with said discs, a brake frame supported from the ends of said assembly, said frame comprising a pocket adjacent each disc, a cylinder housing in each pocket, and brake levers fulcrumed in respective housings for connection to respective friction means.

12. In a brake arrangement, a wheel and axle assembly, a brake disc driven thereby, friction means for engagement with said disc, a brake frame supported from said assembly, said brake frame comprising a pocket adjacent said disc, a cylinder housing in said pocket, brake levers in said housing and supporting said friction means, and means pivotally fulcruming each lever, said last-mentioned means also affording securement for said housing with respect to said brake frame.

13. In a brake frame, a rigid member having means affording support therefor with respect to an associated vehicle, a cylinder housing pocket in said member, a cylinder housing seated therein, and readily removable means affording securement for said housing within said pocket.

14. In a brake frame, a member comprising a cylinder housing pocket adjacent each end thereof and an intermediate portion for torque connection to an associated vehicle frame, a cylinder housing in each pocket, brake levers extending into said cylinder housings, means on each end of said first mentioned member formed and arranged for torque connection to an associated support member, and means for securing said housings within said pockets, said last-mentioned means also affording pivotal fulcrums for said brake levers.

15. In a brake frame, a rigid member comprising a cylinder housing pocket, a cylinder housing seated therein, brake levers extending into said housing, and readily removable means affording securement for said housing within said pocket, said means also affording pivotal fulcrums for said levers.

16. In a brake arrangement for a railway car truck comprising a truck frame and a supporting wheel and axle assembly, the combination of a brake frame supported from said truck adjacent said assembly, a pocket in said brake frame, and a brake unit comprising a housing removably secured to said brake frame within said pocket, brake means supported by said housing for decelerating said assembly, and actuating means within said housing operatively associated with said brake means.

17. In a brake arrangement for a railway car truck comprising a truck frame and a supporting wheel and axle assembly, the combination of a brake frame supported by said truck, a pocket in the top of said brake frame, and a brake unit comprising a housing, means removably connecting said housing to said brake frame within said pocket, brake means supported by said housing for decelerating said assembly, and operating means within said housing for said brake means.

18. In a brake arrangement for a railway car truck comprising a truck frame and a supporting wheel and axle assembly, the combination of a brake frame adjacent said assembly, a connection between said frames at approximately the longitudinal center-line of the truck frame, a connection between said brake frame and said assembly at one side of said center line, a pocket in the top of said brake frame, and a brake unit comprising a housing removably secured to said brake frame within said pocket, brake means supported by said housing for decelerating rotation of said assembly, and actuating means within said housing operatively associated with said brake means.

19. In a brake arrangement for a railway car truck comprising a truck frame and a supporting wheel and axle assembly, the combination of a brake frame supported from said truck at points spaced laterally thereof, a pocket in the top of said brake frame intermediate said points, and a brake unit comprising a housing, means removably connecting said housing to said brake frame within said pocket, a brake lever fulcrumed to said housing, actuating means within said housing operatively associated with said lever, and brake means carried by said lever for decelerating rotation of said assembly.

20. In a brake frame, a rigid member having means affording support therefor with respect to an associated vehicle, a pocket in the top of said member, a housing seated on said member within said pocket, readily removable means securing said housing within said pocket, and a brake lever fulcrumed to said housing and extending into the same for cooperation with the associated actuating means therein.

CARL E. TACK.

REFERENCES CITED

The following references are of record in the file of this patent:

UNITED STATES PATENTS

| Number | Name | Date |
|---|---|---|
| 2,011,411 | Kindler | Aug. 13, 1935 |
| 2,162,788 | Patterson | June 20, 1939 |
| 2,236,898 | Eskergian | Apr. 1, 1941 |
| 2,251,688 | Eksergian | Aug. 5, 1941 |
| 2,276,337 | Pflager | Mar. 17, 1942 |